UNITED STATES PATENT OFFICE.

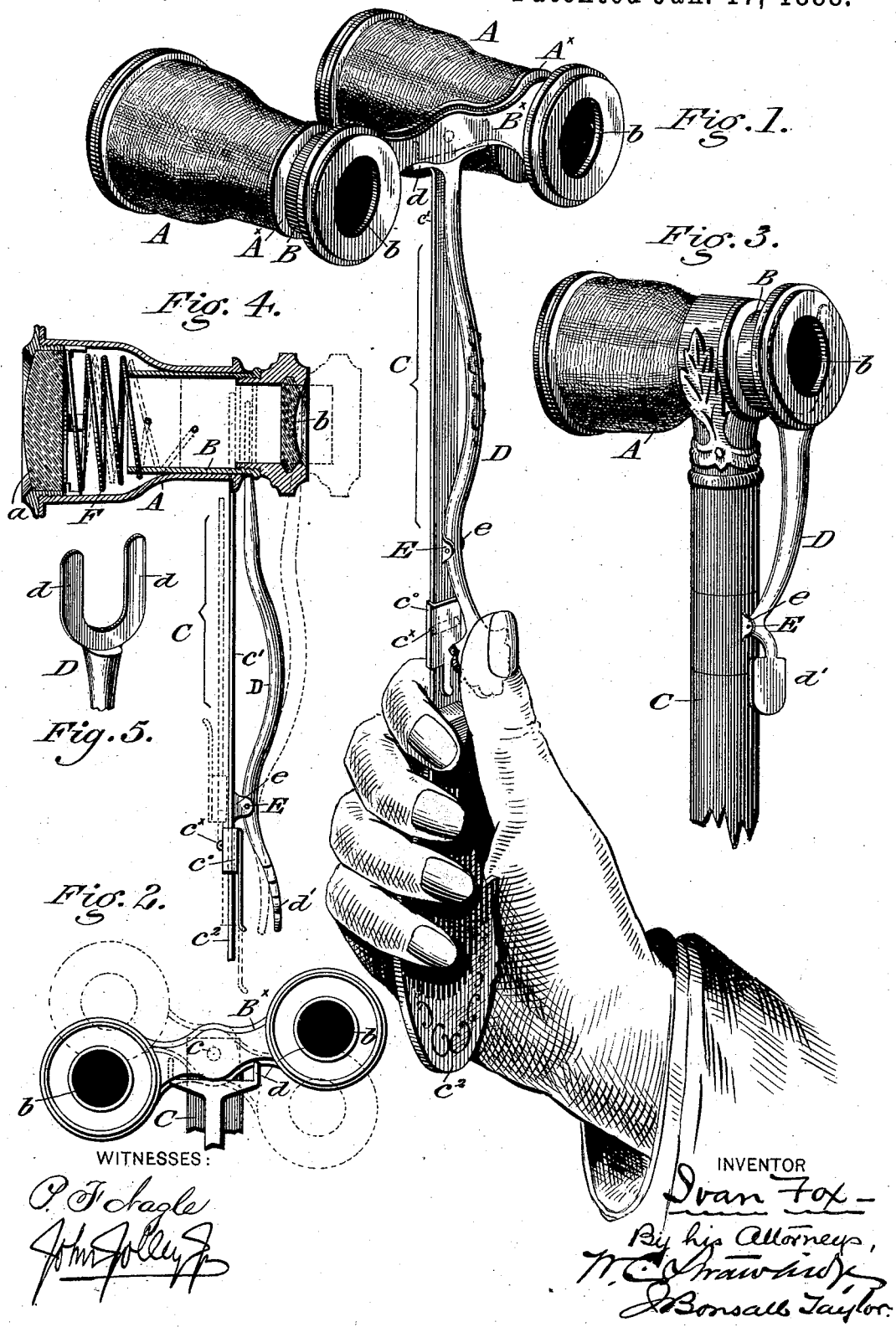

IVAN FOX, OF PHILADELPHIA, PENNSYLVANIA.

ADJUSTING ATTACHMENT FOR OPERA AND OTHER GLASSES.

SPECIFICATION forming part of Letters Patent No. 376,434, dated January 17, 1888.

Application filed April 25, 1887. Serial No. 236,102. (No model.)

*To all whom it may concern:*

Be it known that I, IVAN FOX, a citizen of the United States, residing in the city and county of Philadelphia, in the State of Pennsylvania, have invented an Improvement in Opera, Field, and Kindred Glasses, of which the following is a specification.

My invention relates to and is applicable in connection with opera, field, and other binocular glasses, and may also be applied to monocular or single-barreled glasses.

The barrels of glasses of the foregoing character are each composed of two tubes, one of which contains the field lens, and the other the eye lens, the said tubes being fitted and slide the one within the other, whereby the lenses are carried toward or from each other so as to adjust the focus with reference to the eyes of a particular user.

The object of my invention is to provide such glasses as are above described with a focus adjusting mechanism at once more speedy and convenient than any heretofore constructed, and also with a depending handle by which they can be held to the wearer's eyes with greater ease, and upon and in connection with which handle the adjusting mechanism referred to may be mounted and operated.

Glasses embodying my invention are represented in the accompanying drawings and described in this specification, the particular subject matter claimed as novel being hereinafter definitely specified.

In the drawings, Figure 1 is a perspective view of an opera glass embodying my invention, and illustrative of the manner of its use. Fig. 2 is an end elevational diagrammatic view of the glass and a part of the connected appliances shown in Fig. 1, which also represents in full and dotted lines inclinations which the glasses and handle may assume with respect to each other. Fig. 3 is a perspective view of a single-barreled or monocular glass to which my invention is applied. Fig. 4 is a sectional elevation of the same, illustrating in full lines the closed and in dotted lines the extended position of the tubes. Fig. 5 is a detail of the pronged lever which operates against the lens head of the draw tube of Figs. 3 and 4.

Similar letters of reference indicate corresponding parts.

In the drawings A A are the body tubes of a pair of opera glasses, in which are mounted the field lenses, $a$, and $A^\times$ is the main yoke which rigidly connects the said tubes.

B B are the draw tubes, in which are mounted the eye lenses, $b$, and $B^\times$ is a yoke rigidly connecting said draw tubes.

To the main yoke $A^\times$ is attached the handle C, preferably in such manner as to be angularly adjustable with respect to the axis of said yoke. I prefer to attach the handle by employing a flat-headed pivot or bolt $c$ passing through its flat upper extremity and through the main yoke, which bolt is equipped with a flat head or nut, so that, the said two heads bearing frictionally respectively against the handle and yoke, the handle may be maintained at any given lateral angle to the yoke, as shown in Fig. 2.

The handle C is composed of two members, an upper and a lower, which I respectively designate $c'$ $c^2$, and they are connected by a hinge $c^\times$ which allows of the handle being folded back upon itself when not in use, so as to be more compact. A sliding collar $c^\circ$ is placed upon the handle and when the two members of the handle are aligned or extended for use, the collar is slipped over the hinge so as to render the handle as an entirety rigid. A hinged handle of the foregoing construction is convenient and answers the purpose. Other methods of forming an extensible handle may, however, be resorted to,—as, for example, by having the handle members mounted upon, so as to slide telescopically within or otherwise with respect to, each other.

Within the body tubes are contained springs F, the tendency of which is to maintain the draw tubes to their full extent within the body tubes. One of these springs, which may be of any variety or disposed in any manner, is, in Fig. 4, shown as being placed in the body tube immediately behind the field lens, and as having one end secured to the interior of the body tube and the other to the inner extremity of the draw tube. The spring is a tightly coiled helix, the constant effort of which to maintain itself compacted retains the draw tube in, to the fullest extent of its inward movement, within the body tube.

D is a lever of any preferred size and configuration, fulcrumed intermediately of its length by a pivot E which passes through it and is journaled in ears or lugs e formed as a part of or connected with the handle. The upper end of the lever D is preferably forked, or provided with two prongs d d which extend to and lie between the yokes A× and B×, and its lower end is provided with a thumb bearing d' of suitable size and location referably to the handle C to be conveniently pressed by the thumb. The prongs d d of the bar D are not attached to the yoke B×, against the inner face of which, in the operation of the device, they press when the lever is operated to overcome the stress of the springs F and extend the draw tubes. By the provision of these freely riding prongs any possible binding of the sliding tubes is avoided, and the capability for oblique adjustment referred to, secured.

In Fig. 3, which, as stated, represents a monocular or single barreled glass embodying my invention, the application of the several devices is essentially the same as in the opera glass, the handle C being attached to the body tube, and the lever bar D to the handle, the forks of the lever bar partly encircling the draw tube and acting against the lens head of said tube.

In Fig. 3, the handle is unjointed, while in Fig. 4 it is jointed as in Fig. 1.

The gist of this invention residing in the application of a lever to adjust the focus of the lenses of a binocular or monocular opera glass, it is obvious that the invention is not to be literally restricted to the specific construction represented and described. Thus, while it is preferable to connect the handle to the main yoke in a double barreled glass, it is equally easy to connect it direct to the body tubes. Thus, also, the lever, which is fulcrumed upon the handle may in a double barreled glass act against the lens heads of the draw tube instead of against their connecting yoke. Thus, also, it is possible to dispense with the spring for closing the draw tubes within the body tubes and to cause the movement of the draw tubes in either direction by the direct or reverse movement of the lever the latter being positively connected to the draw tubes. The embodiment represented is, however, the most convenient, and one to which I prefer to resort. It is also obvious that the handle may be connected with the draw tubes instead of with the body tubes, and the lever act in connection with the body tubes rather than with the draw tubes, it being, of course, inconsequential so long as separation and consequent focal adjustment is effected by a lever whether the lever acts upon the body tube or the draw tube.

Having thus described my invention, I claim and desire to secure by Letters Patent:—

1. The combination with a single or double barreled opera glass, of a handle for carrying said glass, and a lever pivotally attached to said handle for effecting the focal adjustment of the lenses of said glass, substantially as set forth.

2. In a single or double barreled opera glass, the combination of a handle for carrying the instrument as an entirety, with a lever fulcrumed upon said handle and acting upon their respective carrying tubes to effect focal adjustment between the field and the eye lenses, substantially as set forth.

3. In an opera glass, the following elements in combination:—a body tube carrying a field lens, a draw tube carrying an eye-lens and telescopically fitted to the body tube, a handle for supporting said tubes, a spring for maintaining the tubes closed together, and a lever for separating said tubes to effect a given focal adjustment between the lenses of the said tubes, substantially as set forth.

4. In an opera glass, the combination of a handle depending from the main yoke, the lever fulcrumed upon said handle and bearing against the yoke of the draw tubes, and a spring for maintaining the tubes together, substantially as set forth.

5. In an opera glass, a handle connected with the body tubes, in combination with a lever fulcrumed upon said handle and acting to move the draw tubes, substantially as set forth.

6. In an opera glass, the combination of a handle depending from the main yoke and pivotally attached thereto so as to be laterally adjustable, and a lever fulcrumed upon said handle and bearing against the yoke of the draw tubes, substantially as set forth.

7. In an opera glass, the combination of a handle depending from the main yoke, and a lever fulcrumed to said handle and terminating in forks to engage the draw tubes, substantially as set forth.

8. In an opera glass, the combination of a handle depending from the main yoke, composed of two members hinged together, and provided with a sliding collar adapted to cover the hinge and rigidify the handle when the same is unfolded, and a lever pivoted upon said handle about its upper member, substantially as set forth.

In testimony whereof I have hereunto signed my name this 4th day of March, A. D. 1887.

IVAN FOX.

In presence of—
J. BONSALL TAYLOR,
WM. C. STRAWBRIDGE.